United States Patent Office 3,042,715
Patented July 3, 1962

3,042,715
IODINE-CONTAINING BENZOIC ACID AMIDES AND A PROCESS OF MAKING SAME
Werner Obendorf and Peter Meindl, Linz, Austria, assignors to Osterreichische Stickstoffwerke Aktiengesellschaft, Linz, Austria
No Drawing. Filed Nov. 16, 1959, Ser. No. 852,974
Claims priority, application Austria Dec. 3, 1958
11 Claims. (Cl. 260—518)

The invention relates to new, iodine-containing benzoic acid amides, particularly to new valuable amides of 2,4,5,6-tetraiodobenzoic acids which are substituted or unsubstituted at carbon atom 3, and to a process of manufacturing the same.

The invention provides new, valuable 2,4,5,6-tetraiodobenzoic acid amides which are substituted or unsubstituted at carbon atom 3, and which are valuable X-ray contrast agents, particularly for oral administration, for cholecystography.

The invention provides also a new, simple and advantageous process of producing such 2,4,5,6-tetraiodobenzoic acid amides which are substituted or unsubstituted at carbon atom 3.

Further objects of the invention and useful features thereof will become apparent as the specification proceeds.

The new polyiodated benzoic acid amides correspond, on principle, to the general formula:

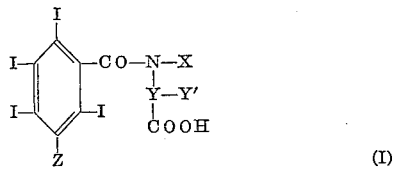
(I)

wherein Z is a representative of the class consisting of the hydrogen atom, the iodine atom, the amino group and the acylamino group having at most 4 carbon atoms, X a representative of the class consisting of hydrogen, the akyl radical, the cycloalkyl radical, the aralkyl radical, the aryl radical, the substituted alkyl radical, the substituted cycloalkyl radical, the substituted aralkyl radical and the substituted aryl radical, the substituent being selected from the class consisting of the hydroxyl group, the lower alkoxy group and the group

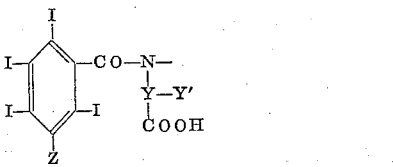

said radical X containing a total of not more than 20 carbon atoms, Y is a representative of the class consisting of a methylene radical, a polymethylene radical having at most 6 carbon atoms, a cycloalkylene radical having 5 to 6 carbon atoms and a phenylene radical, and Y' is a representative of the class consisting of hydrogen, the lower alkyl radical and the phenyl radical.

It is known that iodine has a very high absorption for X-rays in the medical wave range and that organs in which iodine is enriched become visible in the radiograph. This enriching may be effected by the, e.g., oral or parenteral administration of nontoxic organic compounds, which contain very firmly bonded iodine and which have the property of being discharged in the body to a large extent by way of a specific organ, e.g., the gall bladder or the kidneys. As the iodine concentration in the organ will determine the shade effect the amount of X-ray contrast agent to be administered will be determined mainly by the iodine content of the preparation if the tendency to reach a specific organ is the same. For this reason, X-ray contrast agents based on aromatic compounds having 4 or 5 iodine atoms in the nucleus have the advantage of a higher iodine content involving a lower dosage compared to most of the commercial preparations which contain only 2 or 3 iodine atoms in the nucleus.

It has now been found that the new tetraiodobenzoic acid amides substituted or unsubstituted at carbon atom 3, of the general Formula I, having 4 or 5 iodine atoms in the molecule, are good X-ray contrast agents. In this connection it is remarkable that this class of compounds contains compounds discharged through the gall bladder and compounds discharged through the kidneys. The new polyiodated benzoyl compounds are effective in the case of parenteral or oral application. Owing to their particularly high iodine content a relatively low dosage is sufficient for an adequate showing of the gall bladder.

It has also been found that amides of the polyiodated benzoic acids of the formula

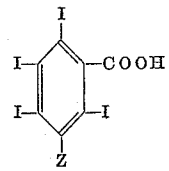

wherein Z has the meaning defined above, which are mono- or disubstituted at the nitrogen, can be prepared in a simple manner and in a very good yield if the appropriately iodated benzoyl radical is introduced into primary or secondary amines of aliphatic, alicyclic, araliphatic or aromatic character, which may be substituted by hydroxyl or alkoxy groups in the substituents attached to the nitrogen, by a treatment with the new acid chlorides of the formula

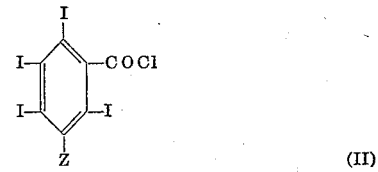
(II)

wherein Z has the meaning defined above.

For instance, for producing the polyiodated benzoylamides of the general Formula I the new acid chlorides of the Formula II are reacted with amino acid esters of the formula

(III)

wherein alkyl represents a lower alkyl radical and X' a representative of the class consisting of the hydrogen atom, the alkyl radical, the cycloalkyl radical, the aralkyl radical, the aryl radical, the substituted alkyl radical, the substituted cycloalkyl radical, the substituted aralkyl radical and the substituted aryl radical, the substituent being selected from the group consisting of the hydroxyl group, the lower alkoxy group and the group

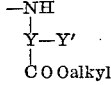

said radical X' containing a total of not more than 12 carbon atoms and Y and Y' having the meaning defined above, and any ester groups contained in the process products are subsequently transformed into the free acid group or the alkali salts by a treatment with saponifying agents. The reaction is suitably carried out at elevated temperatures, e.g., at temperatures between 70° and 200°

C. In many cases this involves such a strong evolution of heat that the reaction must be damped by cooling or an addition of a solvent. In some cases the reaction can be promoted by an addition of an acid-combining agent such as tertiary amines, e.g., trialkylamines.

The reaction according to the invention may be effected without an addition of a solvent or in an inert organic solvent. Such inert organic solvents may consist, e.g., of aliphatic ketones, ether or dioxan.

In the reaction, performed according to the invention, of the new acid chlorides of Formula II with the esters of Formula III, excellent results are obtained where N-mono- and N-disubstituted amino acids are used. The substituents at the nitrogen may be of aliphatic, alicyclic, araliphatic or aromatic character.

In the reaction of diamino-bis-alkanecarboxylic acid esters, preferably of the formula

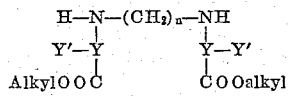

wherein Y and Y' have the meaning defined above, with 2 moles of the iodated benzoic acid amides of Formula II, both amino groups react and compounds are obtained which contain two tetraiodobenzoyl, tetraiodoaminobenzoyl, tetraiodoacylaminobenzoyl or pentaiodobenzoyl radicals, i.e., 8 or 10 iodine atoms in the molecule. The reaction of the analogous phenylene diamino- and cycloalkylenediamino-bis-carboxylic acids with the polyiodated acid chlorides according to the present invention and the appertaining process products are not intended to be covered by the present application.

It is obvious that the 3-acylamino-2,4,5,6-tetraiodobenzoyl compounds of Formula I cannot be obtained only by a reaction of the amino acids of Formula II with the 3-acylamino-2,4,5,6-tetraiodobenzoylchloride but also by acylating the corresponding 3-amino-2,4,5,6-tetraiodobenzoylamides of Formula I in a manner known per se with acylating agents such as acetic acid anhydride, acetyl chloride, propionyl chloride or butyryl chloride.

Where esters of amino acids of Formula III are used as starting material the carboxyl group must subsequently be saponified in the iodated benzoic acid amide obtained after the reaction with the iodated benzoic acid chloride. For this saponification reaction the use of alcoholic alkali hydroxides is to be primarily recommended. From the alkaline saponification solution either the alkali salts of the polyiodated benzoic acid amides according to the invention or, after acidulating, the free acids can be recovered. It is obvious that the free acids of the iodated benzoylamides according to the invention may also be transformed into the alkali salts by a treatment with alkalies.

The new polyiodated benzoic acid chlorides of Formula I can be obtained in a simple manner by a reaction of corresponding acids, which are also new, namely, of 2,4,5,6-tetraiodobenzoic acid, 3-amino-2,4,5,6-tetraiodobenzoic acid, 3-acylamino-2,4,5,6-tetraiodobenzoic acid and 2,3,4,5,6-pentaiodobenzoic acid, with thionyl chloride. When the 3-amino-2,4,5,6-tetraiodobenzoylchloride is obtained in this manner the 3-thionylamino-2,4,5,6-tetraiodobenzoylchloride is then obtained as intermediate product, which can either be separated as such or, without separation, can be transformed in the reaction mixture into the 3-amino-2,4,5,6-tetraiodobenzoylchloride by a treatment with alkali or acid.

2,4,5,6-tetraiodobenzoic acid is obtained from 5-amino-2,4,6-triiodobenzoic acid by diazotizing the amino group and a reaction with potassium iodide. 3-amino-2,4,5,6-tetraiodobenzoic acid may be recovered by iodating 3-iodo-5-aminobenzoic acid with NaCl—CII solution. This again can be transformed by acylating into the 3-acylamino-2,4,5,6-tetraiodobenzoic acid, or into the pentaiodobenzoic acid by diazotizing and treatment with potassium iodide.

The X-ray contrast agents according to the invention may be administered orally as free acids or in the form of the non-toxic salts. The non-toxic salts of non-toxic bases include mainly those with inorganic bases, such as the sodium salt or the lithium salt, or those with organic bases, such as the diethanolamine salt or the methyl glucosamine salt. The free acids as well as the non-toxic salts may be processed to form tablets together with binders such as starch, talc, polyethylene glycol, magnesium stearate, or both starch and lactic acid. The same mixtures may also be used for making cores for dragées. The polyiodated benzoic acid amides according to the invention may also be filled into gelatine capsules, including heat-sealed ones, and be taken in this form. For this purpose either the free substance is used or a mixture of the substance with an oil which does not attack the gelatine and, possibly, other additions, such as lecithin.

The process of preparing the X-ray contrast agents according to the invention will be described in more detail with reference to the following examples:

Example 1.—67 grams 5-amino-2,4,6-triiodobenzoic acid are dissolved in about 300 milliliters warm concentrated sulfuric acid and cooled to 0° C. This solution has added thereto at 0–5° C. a solution of 12 grams $NaNO_2$ in 100 milliliters concentrated sulfuric acid with stirring. With cooling, 200 milliliters 85% phosphoric acid are then added with cooling. After this addition the ice bath is removed and the mixture is allowed to stand thereafter approximately for one hour. 2 liters ice-water mixture are flowed in to give a yellow, clear solution of the diazonium salts, which is freed from the surplus nitrite by an addition of 12 grams urea. 30 grams KI are then slowly added to the solution. The reaction is terminated by a subsequent heating to about 60° C. The precipitate contained in the reaction product is suction-filtered, dissolved in 1 N NaOH and precipitated by a treatment with sodium sulfite and mineral acid. 73 grams of almost colorless tetraiodobenzoic acid are obtained.

60 grams 2,4,5,6-tetraiodobenzoic acid are dissolved in 200 milliliters $SOCl_2$. After about 20 minutes everything is in solution. The reaction mixture is thereafter stirred for some minutes and the surplus thionyl chloride is distilled off at 50–60° C. under a mild vacuum. The residue crystallizes immediately upon cooling. The product is cleaned by dissolving the crystallizate in ether and treating the ether solution with ice water, cold, dilute alkaline solution and again with water. After the ether solution has been dried, the evaporation causes the crystallization of 59.15 grams pure 2,4,5,6-tetraiodobenzoyl chloride having a melting point of 109° C., yield 95.75%.

Example 2.—71.8 grams 3-iodine-5-aminobenzoic acid (produced according to Wheeler and Liddle, Am. Chem. Journal, 42, page 504), 275 milliliters concentrated HCl are dissolved in 300 milliliters 1 N HCl and 4150 milliliters water. The resulting solution is added in drops to a solution of 660 milliliters 2 N NaCl.CII in 275 milliliters 1 N HCl and 3100 milliliters water at 40° C. within one hour and the reaction mixture is caused to react with stirring for 1½ hours at 80° C. Then additional 200 milliliters 2 N NaCl—CII solution are slowly added. After a reaction for additional two hours the reaction mixture is cooled and the resulting precipitate is separated. 160 grams 3-amino-2,4,5,6-tetraiodobenzoic acid are obtained, which is 91.5% of theory. Melting point 215–230° C. The reaction product has a melting point of 238–239° C. after recrystallization from ethanol.

100 milliliters thionyl chloride are added to 38.4 grams 3-amino-2,4,5,6-tetraiodobenzoic acid, this is followed by boiling for two hours with refluxing. The surplus thionyl chloride is then distilled off in a vacuum, the residue is received in ether and the solution is freed from the insoluble components by suction filtering. The ether solution is shaken first with ice water, then with 1 N NaOH and evaporated to dryness; the evaporation residue is re-solved out of ether. 29.7 grams 3-amino-2,4,5,6-tetraiodobenzoylchloride having a melting point of 162–163° C. Yield 75% of theory.

*Example 3.*—A solution consisting of 6.41 grams 3-amino-2,4,5,6-tetraiodobenzoic acid, 10 milliliters 1 N NaOH, 0.7 gram sodium nitrite and 40 milliliters water is slowly added with stirring to 200 milliliters 0.5 N HCl cooled to 0° C. Then about 1 gram urea is stirred in, whereafter a solution of 15 grams KI in 50 milliliters water is added. The reaction mixture is heated to 95° C. within 15 minutes. The resulting deposit, which is originally dark, becomes light yellow to white. The reaction solution is then decolorized by an addition of NaHSO₃, the precipitated deposit is separated and dried. 6.4 grams pentaiodobenzoic acid are obtained, which corresponds to a yield of 85% of theory. The acid decomposes above 340° C.

15.4 grams pentaiodobenzoic acid have 70 milliliters thionyl chloride added thereto, followed by boiling under reflux for 5½ hours. After the mixture has been cooled the crystalline precipitate is suction-filtered and dried. 10.26 grams pentaiodobenzoylchloride are obtained, melting point 312–316° C. 2.36 grams pentaiodobenzoyl chloride, melting point 315–317° C., can be obtained from the mother liquor by distilling off the thionyl chloride in a vacuum. Total yield 12.62 grams, which is 79.9% of theory.

The acid chloride has two additional modifications having melting points at 264–266° C. and 285° C. The fact that these are modifications has been confirmed by infrared spectrographs.

*Example 4.*—5.0 grams 3-amino-2,4,5,6-tetraiodobenzoylchloride are mixed with 30 milliliters acetic acid anhydride and 1 drop of concentrated sulfuric acid and the mixture is heated to the boil until a complete solution has been effected. The reaction product is then poured into water. The 3-acetylamino-2,4,5,6-tetraiodobenzoylchloride thus precipitated is suction-filtered and thoroughly washed with water. After re-solving out of acetic acid anhydride, 2.92 grams 3-acetylamino-2,4,5,6-tetraiodobenzoyl chloride are obtained, melting point 181–183° C., which corresponds a yield of 55% of theory.

3-acetylamino-2,4,5,6-tetraiodobenzoylchloride is also obtained if 3-acetylamino-2,4,5,6-tetraiodobenzoic acid (prepared by acetylating 3-amino-2,4,5,6-tetraiodobenzoic acid) with surplus thionyl chloride under a reflux until a solution has been effected and the evaporation residue is re-solved from acetic acid anhydride after the surplus SOCl₂ has been removed in a vacuum. From 2.5 grams 3-acetylamino-2,4,5,6-tetraiodobenzoic acid, 1.8 grams 3-acetylamino - 2,4,5,6 - tetraiodobenzoylchloride melting point 178–183° C., are thus obtained, which corresponds to a yield of 70% of theory.

*Example 5.*—32.25 grams 2,4,5,6-tetraiodobenzoylchloride are dissolved in a small amount of acetone and have 13 grams methyl alpha-aminoisobutyrate added thereto. The reaction mixture is carefully heated first until the entire acetone is distilled off, and is subsequently brought to a temperature of 120–130° C. After the reaction has been terminated the mixture is received in about 40 milliliters acetone and is introduced with vigorous stirring into 500 milliliters water, to which some HCl had been added. A precipitate is obtained, which is sucked off. After the water has been removed by distilling with benzene the product is purified by re-solving from methanol. 32.02 grams methyl N-(2,4,5,6-tetraiodobenzoyl)-alpha-aminoisobutyrate are obtained, which is 88% of theory. Melting point 182–186° C. For saponification, 25.8 grams of the methyl ester are heated under reflux together with 13 milliliters 2.96 N methanolic NaOH in 65 milliliters monoethyl glycol ether for ten minutes. The reaction mixture is received in about 1000 milliliters water and precipitated at elevated temperature with surplus HCl. 24.17 grams N-(2,4,5,6-tetraiodobenzoyl)-alpha-amino-isobutyric acid, which is 84% of theory. Decomposition product 292° C.

If the treatment with mineral acid is omitted and ether is added to the alkaline saponifying solution, the sodium salt of N-(2,4,5,6-tetraiodobenzoyl)-alpha-amino-isobutyric acid is obtained.

In an analogous manner, the reaction of 2,4,5,6-tetraiodobenzoyl chloride with (*a*) Ethyl alpha-aminobutyrate gives N-(2,4,5,6-tetraiodobenzoyl)-alpha-aminobutyric acid, melting point 242–249° C. and its sodium salt. Yield 86.79% of theory;

(*b*) Sarcosine ethyl ester gives the sodium salt of N-(2,4,5,6-tetraiodobenzoyl)-sarcosine. Yield 95% of theory;

(*c*) Methyl beta-(2-hydroxyethylamino)-propionate gives N-beta-(2-hydroxyethyl)-N-(2,4,5,6-tetraiodobenzoyl)-beta-aminopropionic acid, melting point 80–90° C. and its sodium salt. Yield 58.2%;

(*d*) Methyl beta-(2-methoxyethylamino)-propionate gives N-beta-(2-methoxyethyl)-N-(2,4,5,6-tetraiodobenzoyl)-beta-aminopropionic acid. Yield 50%;

(*e*) Methyl N-isopropyl-beta-aminopropionate gives N - (2,4,5,6 - tetraiodobenzoyl) - N - isopropyl - beta-aminopropionic acid, melting point 112–118° C., and its sodium salt. Yield 90%;

(*f*) Ethyl N-butylamino acetate gives N-(2,4,5,6-tetraiodobenzoyl)-N-butylaminoacetic acid and its sodium salt. Yield 84.7%;

(*g*) Ethyl N-phenylaminopropionate gives beta-N-(2,4,5,6-tetraiodobenzoyl)-N-phenylaminopropionic acid (amorphous), melting point about 110° C. and its sodium salt. Yield 65%.

*Example 6.*—21.5 grams 2,4,5,6-tetraiodobenzoyl chloride are mixed with 12 grams d,l-phenylglycine ethyl ester with cooling, which is then discontinued. The temperature in the reaction mixture rises first gradually and then rapidly and is maintained at 135° C. for about 5 minutes by careful cooling. This is followed by heating to 100° C. for fifteen minutes after the reaction has gradually ceased. The solid reaction cake is then treated with 200 milliliters boiling water with intense stirring. After sucking off the crystallizate and washing with 1 N HCl and water 26.1 grams ethyl N-(2,4,5,6-tetraiodobenzoyl)-d,l-amino-phenylacetate, melting point 216–224° C. are obtained. Yield 99.6%.

24.46 grams of this ethyl ester together with 12 milliliters 2.68 N methanolic NaOH and a mixture of 50 milliliters methanol and 50 milliliters ethanol are heated to boiling under reflux for 20 minutes. The solution is then poured into about 800 milliliters water and the acid is liberated by a treatment with HCl. After a short boiling the deposit is separated by sucking off. 21.3 grams N-(2,4,5,6-tetraiodobenzoyl)-d,l-aminophenylacetic acid are obtained, which is 90.3% of theory. The acid melts with decomposition at 267–280° C.

In an analogous manner the reaction of 2,4,5,6-tetraiodobenzoylchloride with (*a*) N-phenylglycine ethyl ester gives the N-(2,4,5,6-tetraiodobenzoyl)-N-phenyl-glycine, decomposition point 160° C. Yield 65%;

(*b*) Methyl anthranilate gives N-2,4,5,6-tetraiodobenzoyl)-anthranilic acid, melting point 289–295° C. Yield 86.85% of theory;

(*c*) Ethyl p-aminobenzoate gives N-(2,4,5,6-tetraiodobenzoyl)-p-aminobenzoic acid, melting point 232–248° C. Yield 88.75%;

(*d*) Methyl m-aminobenzoate gives N-(2,4,5,6-tetraiodobenzoyl)-m-aminobenzoic acid, melting point 267–273° C. Yield 94%.

*Example 7.*—22 grams 3-amino-2,4,5,6-tetraiodobenzoyl chloride are mixed with 11 grams methyl-N-beta-hydroxy-ethyl-beta'-aminopropionate and 20 milliliters acetone and heated until the reaction begins with a rise of temperature. Thereby the acetone is distilled off. After the reaction has been terminated the reaction mixture is dissolved in a small amount of dimethyl form-amide and the solution, still warm, is poured with strong stirring into surplus dilute hydrochloric acid. The ether is thus obtained in solid form and can be separated by suction filtering. After drying, 23.0 grams methyl N-(3 - amino - 2,4,5,6 - tetraiodobenzoyl) - N - beta - hydroxyethyl-beta'-aminopropionate, which is 88.5% of theory. Melting point 113° C.

After being dissolved in dioxan and an addition of methanolic NaOH the ester can be saponified at elevated temperatures. When the reaction mixture is poured into surplus ether the sodium salt is precipitated in solid form and can be isolated by suction filtering. From 23 grams methyl ester, 22.1 grams N-(3-amino-2,4,5,6-tetraiodobenzoyl)-N-beta-hydroxyethyl-beta'-aminopropionic acid sodium salt. From the sodium salt the free acid is obtained by dissolving in water and addition of the calculated amount hydrochloric acid. The acid has an indefinite melting point at 129° C. Yield 82%.

In an analogous manner, the reaction of 3-amino-2,4,5,6-tetraiodobenzoylchloride with (a) Ethyl N-butylaminoacetic acid gives N-(3-amino-2,4,5,6-tetraiodobenzoyl)-N-butylaminoacetic acid, melting point 115° C., yield 61%, and its sodium salt;

(b) Methyl beta-N-(n-butyl)-aminopropionate gives beta-N-(3-amino-2,4,5,6 - tetraiodobenzoyl)-N-(n-butyl)-aminopropionic acid, melting point 100° C., yield 65.7%, and its sodium salt;

(c) Methyl beta-N-phenylaminopropionate gives beta-N-(3-amino-2,4,5,6-tetraiodobenzoyl) - N - phenyl-aminopropionic acid, melting point 120° C. Yield 60%, and its sodium salt;

(d) Ethyl alpha-aminobutyrate gives N-(3-amino-2,4,5,6-tetraiodobenzyl)-alpha-amino-n-butyrate, melting point 227° C. (decomposition), yield 63.6%, and its sodium salt;

(e) Ethyl alpha-amino-phenylacetate gives N-(3-amino - 2,4,5,6 - tetraiodobenzoyl)-alpha-amino-phenylacetic acid, melting point 260–264° C., yield 80.5%, and its sodium salt;

(f) Methyl N-phenylaminoacetate gives N-(3-amino-2,4,5,6-tetraiodobenzoyl) - N - phenylaminoacetic acid, melting point 105–110° C., yield 81.5%, and its sodium salt;

(g) Ethyl aminoacetate gives N-(3-amino-2,4,5,6-tetraiodobenzoyl)-aminoacetic acid, melting point 251° C., yield 82.6% of theory, and its sodium salt;

(h) Methyl anthranilate gives N-(3-amino-2,4,5,6-tetraiodobenzoyl)-o-aminobenzoic acid, melting point 290° C., yield 59.9%, and its sodium salt;

(i) Ethyl d,l-alpha-amino-beta-phenylpropnioate gives N - (3 - amino - 2,4,5,6-tetraiodobenzoyl)-1-amino-2-phenylpropionic acid, melting point 97° C., yield 94%, and its sodium salt;

(k) Ethyl p-aminobenzoate gives N-(3-amino-2,4,5,6-tetraiodobenzoyl) - p - aminobenzoic acid, melting point 298° C. (with decomposition), yield 70%, and its sodium salt;

(l) Ethyl-beta-(2 - methoxyethylamino) - propionate gives N-beta-(2-methoxyethyl - N - (3-amino-2,4,5,6-tetraiodobenzoyl)-beta-aminopropionic acid, yield 80%;

(m) Methyl N-isopropyl-beta-aminopropionate gives N-(3-amino - 2,4,5,6 - tetraiodobenzoyl)-N-isopropyl-beta-aminopropionic acid, melting point 124–130° C., and its sodium salt, yield 78%;

(n) Ethyl N-ethylamino actate gives N-(3-amino-2,4,5,6-tetraiodobenzoyl) - N - ethylaminoacetic acid, melting point 126–130° C. and its sodium salt. Yield 84%;

(o) Ethyl alpha-amino-isovalerate gives N-(3-amino-2,4,5,6 - tetraiodobenzoyl) - alpha-amino-isovaleric acid, melting point 130–134° C. and its sodium salt. Yield 77.2%.

(p) Methyl alpha-amino-beta-methyl-n-valerate gives N - (3 - amino - 2,4,5,6 - tetraiodobenzoyl) - alpha-amino-betamethyl - n - valeric acid, melting point 135° C. Yield 78.9%;

(r) Methyl alpha-amino - gamma-methyl-n-valerate gives N - (3 - amino - 2,4,5,6 - tetraiodobenzoyl) - alpha-amino-gamma-methyl-n-valeric acid, melting point 129–132° C. Yield 54.9%, and its sodium salt;

(s) Beta alanine methyl ester gives N-(3-amino-2,4,5,6-tetraiodobenzoyl)-beta-alanine, melting point 246–249° C., yield 52.2%.

Example 8.—23 grams 3-amino-2,4,5,6-tetraiodobenzoyl-chloride and 9.5 grams methyl N-ethyl-beta-amino-propionate were mixed and heated to about 70° C. The reaction takes place with a rise in temperature. After the reaction has been terminated and the mixture has cooled the latter is received in chloroform, subsequently washed with ½ N hydrochloric acid, NaHCO₃ solution and water and finally dried over Na₂SO₄. After the chloroform has been dried in a vacuum the oily methyl ester of beta-N-(3 - amino - tetraiodobenzoyl) - N - ethyl-aminopropionic acid is obtained as a residue. It is dissolved in dioxan. The calculated amount of methanolic NaOH is added thereto and the mixture is allowed to stand at 25° C. for three hours. After this time the saponification has been completed. The free acid can be precipitated by a treatment with 4 N HCl and is sucked off and dried. 17.1 grams beta-N-(3-amino-tetraiodobenzoyl)-N-ethyl-aminopropionic acid, melting point 110° C., are obtained, which corresponds to a yield of 66.2% of theory.

5.3 grams of this acid are dissolved in some methanol. The calculated amount of methanolic sodium hydroxide solution is added thereto and the sodium salt is recovered from the mixture by an addition of a large amount of ether. After sucking off and drying, 4.4 grams beta-N-(3 - amino - tetraiodobenzoyl) - N - ethyl - aminopropionic acid sodium salt is obtained, which is 80.5% of theory.

In an analogous manner, the reaction of 3-amino-2,4,5,6-tetraiodobenzoic acid with (a) Sarcosine ethyl ester gives N-(3-amino-tetraiodobenzoyl)-N-methylaminoacetic acid, melting point 128–130° C., yield 80.7% of theory, and its sodium salt;

(b) Methyl m-aminobenzoate gives N-(3'-amino-tetraiodobenzoyl)-3-aminobenzoic acid, melting point 310–313°, yield 53% of theory.

Example 9.—20 grams pentaiodobenzoylchloride are mixed with 6.8 grams methyl d,l-alpha-amino-n-butyrate and heated until the reaction begins with a sudden rise in temperature. After the reaction has been terminated the reaction mixture is dissolved in chloroform and this solution is washed with dilute hydrochloric acid, sodium bicarbonate solution and water and dried over Na₂SO₄. After the chloroform has been distilled off the residue is caused to crystallize with the aid of methanol. 10.1 grams methyl N-(pentaiodobenzoyl)-alpha-amino-n-butyrate are obtained, which is 45.4 grams of theory. Melting point 245–250° C.

The ethyl ester can be saponified by dissolving in dioxan and adding the calculated amount of methanolic NaOH thereto. From the alkaline saponification solution, the free N - (pentaiodobenzoyl) - alpha-amino-n-butyric acid, melting point 250° C., is obtained in a yield of 86.1% by precipitating with 4 N HCl and separating. In an analogous manner, the reaction of pentaiodobenzoylchloride with (a) Ethyl beta-ethylaminopropionate gives N-(pentaiodobenzoyl) - N - ethyl - aminopropionic acid, melting point 252° C., in a yield of 45%.

Example 10.—2.5 grams N-(3-amino-2,4,5,6-tetraiodobenzoyl)-p-aminobenzoic acid (prepared according to Example 7k) are suspended in 20 milliliters acetic acid anhydride and a drop of concentrated sulfuric acid is added to the suspension. The mixture is heated for three hours to 100° C., then poured into a large amount of water and the aqueous solution is boiled up, causing N-(3-acetyl - amino - 2,4,5,6 - tetraiodobenzoyl) - p - aminobenzoic acid to flocculate. The acid is separated and washed with water. 2.5 grams pure N-(3-acetylamino-2,4,5,6-tetraiodobenzoyl)-p-aminobenzoic acid are obtained, which is 94.9% of theory. Melting point 334° C.

*Example 11.*—1.15 grams 3-acetylamino-2,4,5,6-tetraiodobenzylchloride are mixed with 2.0 grams methyl m-aminobenzoate and some dioxan. The reaction begins with a vigorous rise in temperature. After a reaction time of one hour at about 120° C. the mixture is introduced into 1 N HCl and boiled out. During this treatment the methyl ester of N-(3-acetylamino-2,4,5,6-tetraiodobenzoyl)-m-aminobenzoic acid remains unsolved. It is separated by sucking off and subsequently washed with a large amount of water. The resulting methyl ester of N - (3 - acetylamino-2,4,5,6-tetraiodobenzoyl)-m-aminobenzoic acid melts at 307–309° C. with decomposition.

The ester is dissolved in dioxan and treated with a surplus of methanolic NaOH. Adding 1 N HCl to the alkaline saponification solution causes the precipitation of the free acid. After sucking off and drying, 0.7 gram N - (3 - acetylamino-2,4,5,6-tetraiodobenzoyl)-m-aminobenzoic acid, which is 53.25% of theory. Melting point 300° C. with decomposition.

*Example 12.*—7.2 grams methyl hexamethylene diamine-N,N'-bis-beta-propionate in about 20 milliliters acetone are added to a solution of 33 grams 3-amino-2,4,5,6-tetraiodobenzoylchloride and 7 grams triethylamine in 80 milliliters acetone and 25 milliliters dioxan, which solution has been heated on the water bath. The reaction mixture is heated on the water bath for 2.5 hours. This causes the major portion of acetone to evaporate. The resulting sirup is slowly poured into 3000 milliliters dilute hydrochloric acid with good stirring. The deposit formed in the acid solution is suction-filtered, washed with water and dissolved in chloroform. After the chloroform solution is washed with sodium bicarbonate solution and water the same is dried with sodium sulfate and the evaporation residue is obtained. In this way, 22.45 grams dimethyl hexamethylene-diamine-N,N'-bis - (3 - amino-2,4,5,6-tetraiodobenzoyl)-N,N'-bis-beta-propionate is obtained, which corresponds to a yield of 58.37%.

22 grams of the diester are dissolved in dioxan at elevated temperature. 14 milliliters 2.57 N methanolic NaOH are added thereto, followed by saponification by a slow heating on the water bath. After the addition of some acetone the reaction solution is poured into a large amount of ether. After the ether has been poured off the precipitated sodium salt is dissolved in about 500 milliliters water and the free acid is precipitated with a surplus of mineral acid at elevated temperature. 12 grams hexamethylenediamine - N,N' - bis(3-aminotetraiodobenzoyl)-N,N'-bis-beta-propionic acid are obtained, which is 32.3% of theory. Melting point 155–157° C.

(*a*) In an analogous manner, by reaction of 2,4,5,6-tetraiodobenzylchloride with methyl hexamethylenediamine N,N'-bis-beta-propionate hexamethylene-diamine-N,N' - bis - (2,4,5,6 - tetraiodobenzoyl)-N,N'-bis-beta-propionic acid in a yield of 63% of theory can be obtained. Melting point of the acid 142–148° C.

Instead of alkylamino-acetic acid alkyl esters in the preceding examples, equimolar amounts of other aminoacetic acid derivatives such as Ethyl cyclohexylamino acetate
    Ethyl cyclopentylamino acetate
    Ethyl alpha butylamino butyrate and instead of beta-alkylamino-propionic acid alkyl esters equimolar quantities of Methyl beta-cyclohexylaminopropionate
    Methyl beta-cyclopentylaminopropionate can be used.

The polyiodated benzoic acid amides according to the present invention as described in the preceding examples constitute X-ray contrast agents, preferably for oral administration and may be successfully used for the representation of the gall bladder.

The following examples can be given for the composition of the X-ray contrast agents according to the invention:

*Example 13.*—500 milligrams N-(2,4,5,6-tetraiodobenzoyl)-sarcosine 160 milligrams amylum tritici
    30 milligrams talcum venetum
    10 milligrams magnesium stearate give a composition totalling 700 milligrams, which is used for making tablets.

A core of this composition, having a weight of 350 milligrams, can be processed to form dragées by coating it with a composition consisting of 240 milligrams saccharum album
    6 milligrams gelatine
    3.6 milligrams polyethylene glycol
    0.3 milligram dyestuff The other acids described in Example 5 may be processed in an analogous manner to form tablets or dragées.

*Example 14.*—

500 milligrams N - (3-amino-2,4,5,6-tetraiodobenzoyl)-alpha-aminophenylacetic acid sodium salt
163 milligrams amylum maidis
30 milligrams talcum venetum
5 milligrams magnesium stearate
2 milligrams lauryl alcohol sulfonate give a composition totalling 700 milligrams, which is directly processed to form tablets.

Tablet cores having a weight of 350 milligrams can be processed to form dragées with the following coating composition per dragée:

170 milligrams saccharum album
    70 milligrams talcum venetum
    6 milligrams gelatine
    4 milligrams polyethylene glycol The other salts of the acids of Example 7 can be processed in an analogous manner to form tablets or dragées.

*Example 15.*—

250 milligrams N-(3-amino-2,4,5,6-tetraiodobenzoyl)-N-ethylaminoacetic acid
135 milligrams amylum solani
30 milligrams saccharum lacticum
30 milligrams talcum venetum
5 milligrams magnesium stearate give 350 milligrams of a composition which can be processed to form a tablet core and be coated with the following composition:

117 milligrams saccharum album
    33 milligrams talcum venetum
    100 milligrams polyethylene glycol

*Example 16.*—

500 milligrams N-(2,4,5,6-tetraiodobenzoyl)-sarcosine sodium salt are stirred with 325 milligrams groundnut oil
25 milligrams lecithin to form a flowable paste and filled into gelatine capsules.

*Example 17.*—

500 milligrams beta -N-(3-amino-2,4,5,6-tetraiodobenzoyl)-N-phenyl-aminopropionic acid are stirred with 300 milligrams groundnut oil and
50 milligrams lecithin to form a flowable paste and filled into gelatine capsules.

*Example 18.*—20 grams hexamethylenediamine-N,N'-bis-(2,4,5,6-tetraiodobenzoyl)-N,N-bis-beta-propionic acid disodium salt are filled up with distilled water to a volume of 100 milliliters. This solution can be sterilized and is suitable as an injection solution for intraveneous cholangiography and cholecystography.

We claim:

1. A polyiodated benzoic acid amide compound selected from the group consisting of compounds having the formula

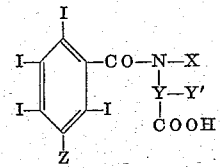

wherein Z is selected from the group consisting of the hydrogen atom, the amino group and the acetylamino group, Y is selected from the group consisting of the methylene radical, the polymethylene radicals containing 2 to 6 carbon atoms and the phenylene radical, Y' is selected from the group consisting of the hydrogen atom, the lower alkyl radicals and the phenyl radical and X is selected from the group consisting of the alkyl radicals having 1 to 6 carbon atoms, the cycloalkyl radicals having 5 to 6 carbon atoms, the phenyl radical, the hydroxyalkyl radicals having 1 to 2 carbon atoms, the alkoxyalkyl radicals having 2 to 4 carbon atoms and the group

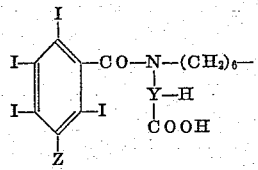

wherein Y and Z have the meaning defined above and the salts thereof with non-toxic bases.

2. A compound of the formula

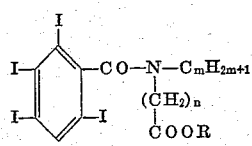

wherein R is selected from the group consisting of hydrogen and sodium, $n$ is an integer from 1 to 2 and $m$ is an integer from 1 to 4.

3. A compound of the formula

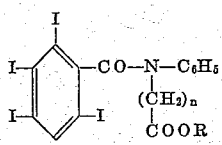

wherein $n$ is an integer from 1 to 2 and R is selected from the group consisting of hydrogen and sodium.

4. A compound of the formula

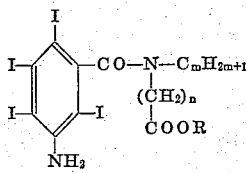

wherein R is selected from the group consisting of hydrogen and sodium, $n$ is an integer from 1 to 2 and $m$ is an integer from 1 to 4.

5. A compound of the formula

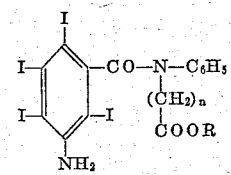

wherein $n$ is an integer from 1 to 2 and R is selected from the group consisting of hydrogen and sodium.

6. N-(3-amino-2,4,5,6-tetraiodobenzoyl) - N-isopropyl-beta-amino-propionic acid.

7. Sodium-N-(3-amino-2,4,5,6 - tetraiodobenzoyl) - N-ethylamino-acetic acid.

8. Beta-N-(3-amino-2,4,5,6-tetraiodobenzoyl)-N-ethylaminopropionic acid.

9. N-(2,4,5,6-tetraiodobenzoyl)-sarcosine sodium salt.

10. Beta-N-(3-amino-2,4,5,6-tetraiodobenzoyl)-N-phenylaminopropionic acid.

11. A method of producing a polyiodated benzoic acid amide of the formula

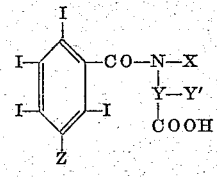

wherein Z is selected from the group consisting of the hydrogen atom, the amino group and the acetylamino group, Y is selected from the group consisting of the methylene radical, the polymethylene radicals containing 2 to 6 carbon atoms and the phenylene radical, Y' is selected from the group consisting of the hydrogen atom, the lower alkyl radicals and the phenyl radical and X is selected from the group consisting of the alkyl radicals having 1 to 6 carbon atoms, the cycloalkyl radicals having 5 to 6 carbon atoms, the phenyl radical, the hydroxyalkyl radicals having 1 to 2 carbon atoms, the alkoxyalkyl radicals having 2 to 4 carbon atoms and the group

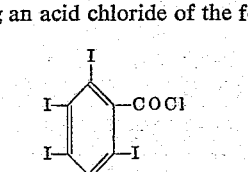

wherein Y and Z have the meaning defined above, which comprises mixing an acid chloride of the formula

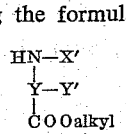

wherein Z has the meaning defined above, and an amino acid derivative having the formula HN—X'
|
Y—Y'
|
COOalkyl wherein alkyl is a lower alkyl group, X' is selected from the group consisting of the alkyl radicals having 1 to 6 carbon atoms, the cycloalkyl radicals having 5 to 6 carbon atoms, the phenyl radical, the hydroxyalkyl radicals having 1 to 2 carbon atoms, the alkoxyalkyl radicals having 2 to 4 carbon atoms and the group

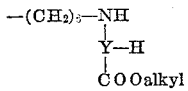

and Y and Y' have the meaning defined above with an inert organic solvent selected from the group consisting of acetone, methyl ethyl ketone, dioxan, ether, chloroform and benzene, allowing the mixture to react at temperatures below 160° C. and subsequently saponifying the resulting ester with methanolic sodium hydroxide.

References Cited in the file of this patent
UNITED STATES PATENTS

| | | |
|---|---|---|
| 2,160,413 | Dohrn et al. | May 30, 1939 |
| 2,247,880 | Guerbet | July 1, 1941 |
| 2,680,133 | Wallingford | June 1, 1954 |
| 2,708,678 | Papa | May 17, 1955 |